United States Patent [19]

Shiiki et al.

[11] Patent Number: 5,688,586
[45] Date of Patent: Nov. 18, 1997

[54] POLY(ETHYLENE OXALATE), PRODUCT FORMED OF MOLDED THEREFROM AND PRODUCTION PROCESS OF POLY (ETHYLENE OXALATE)

[75] Inventors: Zenya Shiiki; Yukichika Kawakami, both of Fukushima-ken, Japan

[73] Assignee: Kureha Kagaku Kogyo K.K., Tokyo, Japan

[21] Appl. No.: 667,265

[22] Filed: Jun. 20, 1996

[30] Foreign Application Priority Data

Jun. 20, 1995 [JP] Japan .................................. 7-176828
Mar. 28, 1996 [JP] Japan .................................. 8-099274

[51] Int. Cl.$^6$ .......................... B32B 00/00; C08F 20/00
[52] U.S. Cl. ..................... 428/221; 528/272; 525/437; 525/446; 525/450; 428/221; 428/364
[58] Field of Search ..................... 528/272; 525/437, 525/446, 450; 428/221, 364

[56] References Cited

U.S. PATENT DOCUMENTS 3,197,445  7/1965  Cline .

OTHER PUBLICATIONS

A. Alksnis, Dz. Deme et al., *Synthesis of Oligoesters and Polyesters From Oxalic Acid and Ethylene Glycol,* J. Polymer Science Polymer Chemistry Ed. vol. 15, pp. 1855–1862 (1977).

Zaikov, *The Mechanism of Chemical Degradation of Polymers: Part 1—Quantitative Prediction of Hydrolytic Stability of Polyesters* Polymer Degration and stability 9 (1984), pp. 41–50 JIS R 7222.

Carothers et al., *Studies on Polymerization and Ring Formation. V. Glycol Esters of Oxalic Acid.* Aug. 5, 1930. pp. 3292–3300.

Japanese Industrial Standard *Physical Testing Methods for High Purity Graphite Material,* Sep. 7, 1985 (English Translation.).

Primary Examiner—Samuel A. Acquah
Attorney, Agent, or Firm—Lowe, Price, LeBlanc & Becker

[57] ABSTRACT

The invention provides poly(ethylene oxalate) containing recurring units represented by the following formula (1):

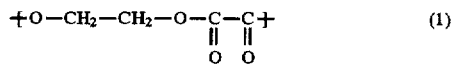

(1)

in a proportion of at least 60 basal mol %, wherein (a) the solution viscosity ($\eta_{inh}$) is at least 0.25 dl/g as measured at 30° C. and a polymer concentration of 0.40 g/dl in a 4:1 (by weight) mixed solvent of m-chlorophenol and 1,2,4-trichloro-benzene, (b) the melt viscosity ($\eta^*$) is at least 30 Pa.s as measured at 190° C. and a shear rate of 1,000/sec, and (c) the density is at least 1.48 g/cm$^3$ as measured in an amorphous state, various products formed or molded from the poly(ethylene oxalate) and a production process of the poly(ethylene oxalate). The polymer is high-molecular weight and excellent in melt processability, heat resistance, crystalline properties, mechanical properties and the like, and has good degradability in soil.

23 Claims, No Drawings

POLY(ETHYLENE OXALATE), PRODUCT FORMED OF MOLDED THEREFROM AND PRODUCTION PROCESS OF POLY (ETHYLENE OXALATE)

FIELD OF THE INVENTION

The present invention relates to poly(ethylene oxalate) which is a biodegradable polymeric material, and more particularly to high-molecular weight poly(ethylene oxalate) excellent in melt processability, heat resistance, crystalline properties, mechanical properties and the like, various products formed or molded from the poly(ethylene oxalate) and a production process of the poly(ethylene oxalate).

Since the poly(ethylene oxalate) according to the present invention has good degradability in soil, it can lighten the burden imposed on the environment. In the poly(ethylene oxalate) according to the present invention, oxalic acid is used as a raw material therefor. Since oxalic acid can be prepared by electrolysis or the like of carbon dioxide in the amosphere, the poly(ethylene oxalate) can be said to be a sort of polymer making good use of carbon dioxide.

The poly(ethylene oxalate) in the present invention is a polymer containing, as a principal component, recurring units having a structure that ethylene oxalate, which is a cyclic ester, is ring-opened, and includes a homopolymer and copolymers.

BACKGROUND OF THE INVENTION

Polymeric materials typified by plastics have hitherto been developed and produced in search of high performance and long-term stability. Therefore, many of the polymeric materials are not decomposed in a natural environment, and so the waste disposal and environmental pollution of plastic products have become a great problem on a world-wide scale. In recent years, there has thus been a strong demand for development of a biodegradable polymeric material which can lighten the burden imposed on the environment. In a biodegradation process of a biodegradable polymeric material, in general, a lytic enzyme externally secreted by microorganisms is first adsorbed on the surface of the material to break chemical linkages such as ester linkages, glycoside linkages or peptide linkages in a polymeric chain by hydrolysis. The polymeric material is degraded by the breaking of the chemical linkages to form low-molecular weight products. The low-molecular weight products are further enzymolyzed to form lower molecular weight products such as monomers and dimers in terms of monomer unit. Whether a polymeric material is biodegradable or not can be determined, for example, by burying a product molded or formed from the polymeric material under the ground and then observing whether the product is degraded or not after a fixed period of time.

As examples of biodegradable polymeric materials developed to date, may be mentioned (A) polymeric materials comprising, as a principal component, a natural substance such as starch or protein; (B) nonaromatic polyesters containing asymmetric carbon atoms; and (C) nonaromatic polyesters containing no asymmetric carbon atom. However, the polymeric materials comprising, as a principal component, the natural substance are poor in melt processability, water resistance, mechanical properties and the like and have been unsatisfactory from the viewpoint of practical use. The nonaromatic polyesters containing the asymmetric carbon atoms are low in productivity because a culture process making use of microorganisms is essential in a production step of a raw monomer or a production step of a polymer. As a result, such polyesters have become extensive and have hence been extremely unsatisfactory from the viewpoint of cost. As examples of the nonaromatic polyesters containing no asymmetric carbon atom, may be mentioned aliphatic polyesters containing no asymmetric carbon atom, such as polysuccinates and polycaprolactone. However, many of these aliphatic polyesters are low in heat resistance as demonstrated by their melting points of about 110° C. or lower and have been difficult to apply to, in particular, fields of food packaging materials and the like, of which high heat resistance is required for sterilization and cooking.

On the other hand, poly(ethylene oxalate) is a nonaromatic polyester containing no asymmetric carbon atom as disclosed in the following documents (i) to (iv) and are known as a polymer having a high melting point. However, the conventional polymers are too low in molecular weight to melt-process, or are poor in mechanical properties, and have hence been worth little from the viewpoint of practical use.

(i) W. H. Carothers et al. reported that ethylene glycol and diethyl oxalate are heated to prepare an ester, and the ester is subjected to fractional crystallization to obtain poly (ethylene oxalate) having a melting point of 153° C. as a high-molecular weight fraction [J. Am. Chem. Soc., 52, pp. 3292 (1930)]. When this polymer is heated in a vacuum, depolymerization occurs to form ethylene oxalate of the monomer (1,4-Dioxane-2,3-dione). When this monomer is left at rest at room temperature, polymerization takes place. It was reported that this polymerization reaction is accelerated by heating to form a polymer having a melting point of 172° C. However, the poly(ethylene oxalate) obtained in this process is a low-molecular weight substance near to an oligomer rather than a polymer and cannot be applied to common melt processing techniques. Therefore, the formation of melt-formed products such as films and fibers and physical properties thereof were not reported.

(ii) W. K. Cline et al. proposed a method of preparing poly(ethylene oxalate) having film- and fiber-forming properties by heating cyclic ethylene oxalate at a temperature of about 165° C. to about 210° C. in a nitrogen atmosphere with a catalyst such as antimony trifluoride or stannic chloride (U.S. Pat. No. 3,197,445). The cyclic ethylene oxalate of a monomer is prepared by condensation of diethyl oxalate with ethylene glycol using sodium as a catalyst to synthesize a waxy prepolymer and depolymerizing this prepolymer at 191°–216° C., preferably 175°–190° C. under reduced pressure. The purification of the monomer is performed by sublimation at 190°–210° C. under reduced pressure. Then, the purified monomer was subjected by ring opening polymerization using a catalyst such as antimony trifluoride. However, the poly(ethylene oxalate) obtained by this method is still too low in molecular weight, and it was barely reported to obtain fiber-like product by inserting and withdrawing a glass rod in and from a polymeric melt. Therefore, the physical property values of films and fibers were not reported.

(iii) A. Alksnis et al. reported that anhydrous oxalic acid and ethylene glycol are heated in the presence of p-toluenesulfonic acid in benzene at the reflux temperature of benzene to prepare oligo(ethylene oxalate), and the oligomer is then heated under vacuum in the presence of $SnCl_2 \cdot 2H_2O$ to transesterify the oligomer, thereby obtaining poly(ethylene oxalate) having fiber-forming properties [J. Polymer Sci.: Polymer Chemistry Ed., Vol. 15, pp. 1855 (1977)]. However, the poly(ethylene oxalate) obtained by this process is low in molecular weight, and the density of its crystallized product is also as low as at most 1.45 g/cm³. Further, the measurement of its melt viscosity could barely be measured in such a way as the polymer is melted once, and its melt viscosity then measured at a temperature (175° C.) lower than the melting point (178° C.) of the polymer in a supercooling state. Therefore, this polymer is naturally unsuitable for use in melt forming or molding, so that no satisfactory melt-formed or molded product can be provided therefrom, and no report about physical properties of products molded or formed therefrom was made.

(iv) G. E. Zaikov et al. obtained poly(ethylene oxalate) by the polymerization of ethylene oxalate [Polymer Degradation and Stability, 9 (1984) pp. 41–50]. Even in crystallized fibers thereof (crystallinity: 73%), however, the density is as extremely low as 1.475 g/cm³. Since the density of normal crystallized poly(ethylene oxalate) is usually 1.50 g/cm³ or higher, the density of the poly(ethylene oxalate) provided by Zaikov et al. is abnormally low, and it is hence considered to be a polymer extremely low in degree of polymerization. Accordingly, this polymer cannot be possibly considered a polymer possible to melt-form or mold.

On the other hand, reports have been scarcely made of copolymers of ethylene oxalate, which each have a sufficiently high molecular weight to permit the application of melt forming or molding. It goes without saying that there is no report about the fact that copolymerization is performed with a view toward improving the melt processability of poly(ethylene oxalate).

Although Zaikov et al. simultaneously reported about a copolymer of ethylene oxalate, the resulting copolymer has a density very low as 1.46 g/cm³ as measured in the form of tablets, and is a copolymer extremely low in the degree of polymerization as demonstrated by the numerical mean of the degree of polymerization of 160. Accordingly, this copolymer cannot be possibly considered a polymer possible to melt-process.

As described in detail above, the prior art poly(ethylene oxalates) have been polymers relatively low in molecular weight and difficult to form or mold into films, fibers and other products having satisfactory physical properties in accordance with the common melt processing techniques. It has also not been proposed to mold or form poly(ethylene oxalate) as a biodegradable polymeric material into various products to use them.

OBJECTS AND SUMMARY OF THE INVENTION

It is an object of the present invention to provide poly (ethylene oxalate) high in molecular weight and excellent in melt processability, heat resistance, crystalline properties, mechanical properties and the like, various products formed or molded from the poly(ethylene oxalate), and a production process of the poly(ethylene oxalate).

Another object of the present invention is to provide poly(ethylene oxalate) improved in melt processability. More specifically, the object of the present invention is to provide an ethylene oxalate copolymer easy to melt-process, which is improved in heat stability upon melt processing, by a copolymerization process.

A further object of the present invention is to provide poly(ethylene oxalate) which is a biodegradable polymeric material having good degradability in soil, and products formed or molded therefrom.

The present inventors have paid attention to the fact that poly(ethylene oxalate) may become a biodegradable polymeric material having good heat resistance because it has a high melting point and ester linkages in its molecular chain. The inventors have carried out various investigations as to the cause that no high-molecular weight poly(ethylene oxalate) has heretofore been obtained. As a result, it has been found that a high-molecular weight polymer can be obtained by effectively removing impurities present in a monomer. It is also desirable that a ring-opening polymerization reaction be performed at a relatively low temperature.

The poly(ethylene oxalate) according to the present invention is high-molecular weight compared with those obtained by the conventional processes, can be formed or molded into films, fibers, injection-molded products or the like by melt processing techniques, and can lighten the burden imposed on the environment because it exhibits good degradability in soil. The present invention has been led to completion on the basis of these findings.

According to the present invention, there is thus provided poly(ethylene oxalate) containing recurring units represented by the following formula (1):

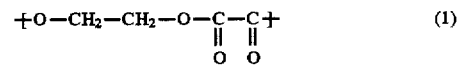

in a proportion of at least 60 basal mol %, wherein (a) the solution viscosity ($\eta_{inh}$) is at least 0.25 dl/g as measured at 30° C. and a polymer concentration of 0.40 g/dl in a 4:1 (by weight) mixed solvent of m-chlorophenol and 1,2,4-trichloro-benzene, (b) the melt viscosity ($\eta^*$) is at least 30 Pa.s as measured at 190° C. and a shear rate of 1,000/sec, and (c) the density is at least 1.48 g/cm³ as measured in an amorphous state.

According to the present invention, there are also provided various products formed or molded from the high-molecular weight poly(ethylene oxalate), such as sheets, films, fibers and injection-molded products.

According to the present invention, there are further provided the following production processes 1 and 2 of poly(ethylene oxalate).

1. A process for the production of poly(ethylene oxalate), which comprises subjecting a cyclic ethylene oxalate monomer obtained by depolymerizing an ethylene oxalate oligomer to ring-opening polymerization by heating the monomer in an inert gas atmosphere, wherein a monomer purified by (i) washing the ethylene oxalate oligomer with an organic solvent to purify, (ii) heating the thus-purified oligomer under reduced pressure to depolymerize, thereby sublimating a monomer formed, and then (iii) recrystallizing the monomer obtained by the sublimation from an organic solvent is used as the cyclic ethylene oxalate monomer.

2. A process for the production of poly(ethylene oxalate), which comprises subjecting a cyclic ethylene oxalate monomer obtained by depolymerizing an ethylene oxalate oligomer to ring-opening polymerization by heating the monomer in an inert gas atmosphere, wherein a monomer obtained by (I) heating a mixture containing the ethylene oxalate oligomer and a high-boiling polar organic solvent under ordinary pressure or reduced pressure to a temperature at which the depolymerization of the oligomer occurs, thereby dissolving the oligomer in the polar organic solvent, (II) further continuing the heating to depolymerize the oligomer in a solution phase, thereby distilling out a monomer formed together with the polar organic solvent, and then (III) recovering the monomer from the distillate is used as the cyclic ethylene oxalate monomer.

DETAILED DESCRIPTION OF THE INVENTION

The present invention will hereinafter be described in detail.

Structure of polymer:

The chemical structure of the poly(ethylene oxalate) according to the present invention is a nonaromatic polyester containing recurring units represented by the formula (1) in a proportion of at least 60 basal mol %, preferably at least 80 basal mol %, more preferably at least 90 basal mol %. Poly(ethylene oxalate) containing the recurring units represented by the formula (1) in a proportion exceeding 99 basal mol % is substantially a homopolymer.

If the proportion of the recurring units (1) is lower than 60 basal mol %, the resulting poly(ethylene oxalate) has a possible problem that its degradability in soil may be impaired, or its heat resistance, crystallinity, mechanical properties and/or the like may be deteriorated.

Exemplary recurring units other than the recurring unit of the formula (1) may include a recurring unit represented by the following formula (2):

a recurring unit represented by the following formula (3):

wherein n is integer of 1-6, and a recurring unit represented by the following formula (4):

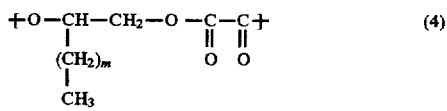

wherein m is an integer of 0-6.

The poly(ethylene oxalate) according to the present invention may be roughly divided into polymers of Group (I), which are homopolymers or near homopolymers, and polymers of Group (II), in which the physical properties of the homopolymers are modified by copolymerization, according to the content of copolymerizing components.

The polymers of Group (I) are polymers containing the recurring units of the formula (1) in a proportion exceeding 99 basal mol % and substantially homopolymers. The polymers belonging to Group (I) are characterized by high performance such as high crystallization rate, high melting point, high strength and high modulus of elasticity.

The polymers of Group (II) are polymers containing 60–99 basal mol % of the recurring units of the formula (1) and 1–40 basal mol % of other recurring units selected from those represented by the formulae (2)–(4) and the like. The polymers belonging to Group (II) are characterized by ease of melt processing, such as low crystallization rate, low melting point and high heat stability upon melting.

The recurring units of the formulae (2)–(4) can be introduced into the molecular chain of the poly(ethylene oxalate), for example, by using, as a comonomer, at least one cyclic monomer selected from the group consisting of lactides, glycolides, lactones (having at most 7 carbon atoms) and alkylene oxalates (the alkylene group of which has 3–9 carbon atoms), and subjecting the comonomer to ring-opening copolymerization with the cyclic ethylene oxalate monomer. The copolymerization is carried out in such a manner that these recurring units are contained in a proportion of at least 0.1 basal mol %, whereby the crystallization rate of the resulting poly(ethylene oxalate) can be controlled to improve its melt processability. However, if the proportion of these comonomers containing in the resulting copolymer is too high, the copolymer becomes noncrystalline, so that defects such as impaired heat resistance are liable to develop. Accordingly, the upper limit of the proportion of the recurring units derived from the comonomers is 40 basal mol %, preferably 30 basal mol %. Incidentally, each recurring unit is called one basal mole in the present invention.

Since the lactide and glycolide are cyclic diesters, 2 basal moles of recurring units are generally formed from 1 mole of each of these monomers. The recurring unit derived from the lactide is represented by the formula (2). The recurring unit derived from the glycolide is represented by the formula (3) in which n is 1.

As examples of the lactones, may be mentioned β-propiolactone, β-butyrolactone, pivalolactone, γ-butyrolactone, δ-valerolactone, β-methyl-δ-valerolactone and ε-caprolactone. The recurring unit derived from the lactone is represented by the formula (3) in which n is 2–6.

As examples of the alkylene oxalates, may be mentioned those the alkylene group of which has 3–9 carbon atoms, such as propylene oxalate. The recurring unit derived from the alkylene oxalate is represented by the formula (4).

Physical properties of polymer:

The poly(ethylene oxalate) according to the present invention is a biodegradable polymeric material, which has a high molecular weight, is excellent in heat resistance, crystalline properties, mechanical strength, melt processability and the like and shows good degradability in soil.

<Molecular weight>

The poly(ethylene oxalate) according to the present invention is a high-molecular weight polymer. The molecular weight of the poly(ethylene oxalate) can be evaluated by its solution viscosity ($\eta_{inh}$) and melt viscosity ($\eta^*$).

The solution viscosity ($\eta_{inh}$) of the poly(ethylene oxalate) according to the present invention is at least 0.25 dl/g, preferably at least 0.30 dl/g, more preferably at least 0.50 dl/g. The solution viscosity ($\eta_{inh}$) is a value obtained by viscosity measurement at 30° C. and a polymer concentration of 0.40 g/dl in a 4:1 (by weight) mixed solvent of m-chlorophenol and 1,2,4-trichlorobenzene. If the solution viscosity of the poly(ethylene oxalate) is lower than 0.25 dl/g, the molecular weight thereof is low, so that a product formed or molded from such a polymer by melt processing may possibly be insufficient in mechanical properties from the viewpoint of practical use. Besides, if the solution viscosity is lower than 0.25 dl/g, the melt viscosity ($\eta^*$) of the poly(ethylene oxalate) also becomes low, so that such a polymer may possibly be difficult to melt-process.

The melt viscosity ($\eta^*$) of the poly(ethylene oxalate) according to the present is at least 30 Pa.s, preferably at least 50 Pa.s, more preferably at least 100 Pa.s. The melt viscosity ($\eta^*$) is a value obtained by viscosity measurement at 190° C. and a shear rate of 1,000/sec. If the melt viscosity ($\eta^*$) of the poly(ethylene oxalate) is lower than 30 Pa.s, drawdown or melt-down tend to occur upon its extrusion, so that such a polymer may possibly be difficult to melt-form or mold. In the case of, for example, melt spinning of the poly(ethylene oxalate), severe drawdown upon melt extrusion makes spinning difficult or impossible. In addition, if the melt viscosity is too low, products formed or molded from the polymer by melt processing may possibly be insufficient in mechanical properties from the viewpoint of practical use.

<Thermal properties>

Although the poly(ethylene oxalate) according to the present invention is high in melting point, crystallinity and crystallization rate, its thermal properties may be widely varied by changing the composition upon copolymerization. More specifically, (A) a crystalline polymer high in crystallization rate, (B) a crystalline polymer low in crystallization rate and (C) a substantially noncrystalline polymer may be obtained by changing the kinds of copolymerizing components, the proportion of the copolymerizing components upon the copolymerization, and/or the like.

(A) Crystalline poly(ethylene oxalate) high in crystallization rate:

Those belonging to this kind of polymers are homopolymers of ethylene oxalate or copolymers containing copolymerizing components other than ethylene oxalate in an extremely low proportion. Namely, the polymers of Group (I) correspond to the poly(ethylene oxalate) of this kind. However, those containing the copolymerizing components in an extremely low proportion among the polymers of Group (II) may also correspond to this kind of polymers in some cases.

Such poly(ethylene oxalate) typically has the following thermal properties:

(1) the melting point (Tm) being at least 130° C.;
(2) the melt enthalpy ($\Delta$Hm) being at least 20 J/g; and
(3) the melt crystallization enthalpy ($\Delta$Hmc) being at least 20 J/g.

The melting point (Tm) and melt enthalpy ($\Delta$Hm) are a melting point and a melt enthalpy detected when heating an amorphous sheet sample 0.2 mm thick by means of a differential scanning calorimeter (DSC) at a rate of 10° C./min in an inert gas atmosphere. The melt crystallization enthalpy ($\Delta$Hmc) is a melt crystallization enthalpy detected when cooling the amorphous sheet sample at a rate of 10° C./min immediately after heating the amorphous sheet sample to 220° C.

The crystalline poly(ethylene oxalate) high in crystallization rate generally has high heat resistance of at least 130° C., preferably at least 150° C., more preferably at least 170° C. in terms of melting point (Tm). Poly(ethylene oxalate) having a melting point (Tm) lower than 130° C. is insufficient in heat resistance, so that when it is used as, for example, a food packaging material, its sterilizing treatment such as retorting becomes difficult. Accordingly, it is difficult to use such a polymer in fields of food packaging materials, wrapping materials for electronic ranges, medical materials, and the like.

As an index to the crystallinity of the crystalline poly (ethylene oxalate) high in crystallization rate, the polymer has a melt enthalpy ($\Delta$Hm) of at least 20 J/g, preferably at least 30 J/g, more preferably at least 40 J/g. If the melt enthalpy ($\Delta$Hm) is smaller than 20 J/g, it is difficult for the polymer to achieve the heat resistance of at least 130° C., and the resulting molded or formed products may also possibly be insufficient in mechanical properties. As an index to the crystallization rate of the crystalline poly (ethylene oxalate) high in crystallization rate, the polymer has a melt crystallization enthalpy ($\Delta$Hmc) of at least 20 J/g, preferably at least 25 J/g, more preferably at least 30 J/g.

The poly(ethylene oxalate) having the above-described thermal properties is particularly suitable for use in molding or forming such as injection molding, multifilament spinning and melt blowing.

(B) Crystalline poly(ethylene oxalate) low in crystallization rate:

Those belonging to this kind of polymers are copolymers containing the recurring units of the formula (1) as a principal component and a small amount of copolymerizing components. Namely, among the polymers of Group (II), copolymers containing the copolymerizing components in a low proportion correspond to the poly(ethylene oxalate) of this kind.

Such poly(ethylene oxalate) typically has the following thermal properties:

(1) the melting point (Tm) being at least 130° C.;
(2) the melt enthalpy ($\Delta$Hm) being at least 20 J/g; and
(3) the melt crystallization enthalpy ($\Delta$Hmc) being smaller than 20 J/g.

The melting point (Tm), which is used as an index to the heat resistance, and the melt enthalpy ($\Delta$Hm), which is used as an index to the crystallinity, are almost the same as those in Group (A). What differs from those in Group (A) is crystallization rate. As an index to the crystallization rate of the crystalline poly(ethylene oxalate) low in crystallization rate, the polymer has a melt crystallization enthalpy ($\Delta$Hmc) smaller than 20 J/g, preferably smaller than 15 J/g.

The poly(ethylene oxalate) high in crystallization rate in Group (A) is easy to form coarse crystals upon its extrusion or the like, so that the resulting formed product may possibly become deteriorated. However, when its crystallization rate is made low by copolymerization (Group II) or other means like the polymers in Group (B), the formation of the coarse crystals upon melt processing can be reduced. According to the poly(ethylene oxalate) low in crystallization rate as described above, forming such as monofilament spinning, inflation, blowing and besides extrusion such as T-die extrusion may be improved.

(C) Substantially noncrystalline poly(ethylene oxalate):

Those belonging to this kind of polymers are copolymers containing the recurring units of the formula (1) as a principal component and a relatively great amount of copolymerizing components. Namely, among the polymers of Group (II), copolymers containing the copolymerizing components in a high proportion correspond to the poly(ethylene oxalate) of this kind.

<Heat stability upon melt processing—ease of melt processing>

Since the prior art poly(ethylene oxalate) is unstable to heating, and its thermal decomposition temperature, Td is near to its melting point, Tm, the polymer may possibly undergo thermal decomposition when heating the polymer to a temperature not lower than Tm to melt it upon melt processing, so that difficulty has been encountered on the melt processing. On the other hand, the poly(ethylene oxalate) according to the present invention is considerably improved in heat stability even in a homopolymer because it is produced by ring-opening polymerization of a monomer high in purity. Therefore, its melt processing has come to be feasible with ease.

When Tm of a polymer of Group (II) described above is lowered without greatly lowering its Td by adding a suitable amount of the copolymerizing components, thereby widening a difference between Tm and Td, the heat stability at its melt-processing temperature (usually, Tm+about 10° C.) is widely improved, so that the melt processing becomes feasible with more ease.

The heat stability of a polymer upon melt processing can be quantitatively evaluated, for example, by an average rate of weight loss [an average rate of weight loss for 30 minutes from the beginning at a melt-processing temperature (i.e., Tm+10° C.)] on thermal decomposition at the melt-processing temperature in an inert atmosphere in accordance with the TGA process. According to this evaluation, the average rate of weight loss at (Tm+10° C.) of the poly (ethylene oxalate) according to the present invention is generally at most 0.5 wt. %/min, preferably at most 0.3 wt. %/min, more preferably at most 0.2 wt. %/min. On the other hand, the average rate of weight loss of the prior art poly(ethylene oxalate) is high, and so such a polymer is poor in heat stability.

As a method for improving the heat stability of the poly(ethylene oxalate) according to the present invention, there is a method in which a comonomer in an amount of at least 1 basal mol % is suitably copolymerized. This method permits the provision of a polymer improved in the heat stability to such an extent that its average rate of weight loss is reduced to at most 0.1 wt. %/min, or further to at most 0.05 wt. %/min according to conditions.

Such poly(ethylene oxalate) is typically a polymer the melt enthalpy ($\Delta$Hm) as an index to the crystallinity of which is smaller than 20 J/g, preferably smaller than 15 J/g. Since the noncrystalline poly(ethylene oxalate) is poor in heat resistance and crystallinity, it may be used in fields of polymer blends, optical materials and the like.

<Density>

The poly(ethylene oxalate) according to the present invention is a high-density polymer whose density is at least 1.48 g/cm$^3$, preferably at least 1.51 g/cm$^3$ as measured in an amorphous state. A polymer whose density is lower than 1.48 g/cm$^3$ as measured in an amorphous state is insufficient in molecular weight and so low in heat stability that foaming occurs upon its melt processing. Therefore, its melt processability and the mechanical properties of products formed or molded from such a polymer by melt processing are extremely unsatisfactory.

<Biodegradability>

The poly(ethylene oxalate) according to the present invention shows good degradability in soil and is hence rated as a biodegradable polymeric material. The degradability in soil can be evaluated by forming an amorphous sheet sample 0.2 mm thick from the poly(ethylene oxalate), burying the sheet sample at the depth of 10 cm under the ground such as a plowland and then observing whether the sheet sample is degraded within a year to lose its original form, or not.

The poly(ethylene oxalate) according to the present invention is degraded in soil within a year. More specifically, the beginning of the degradation is observed in a half month to a month. The reason why the poly(ethylene oxalate) according to the present invention shows good degradability in soil is considered to be attributable to the fact that it is a nonaromatic polyester, and besides it is easy to be digested by microorganisms in soil because it does substantially not contain any asymmetric carbon atom.

Forming or Molding Products:

The poly(ethylene oxalate) according to the present invention can be formed or molded by melt processing into various products such as extruded products of fibers, sheets, films and the like, and injection-molded products. The formed or molded products according to the present invention are characterized by good degradability in soil, high heat resistance, high mechanical properties and the like.

<Unoriented film>

The poly(ethylene oxalate) according to the present invention, which has a melt enthalpy ($\Delta$Hm) of at least 20 J/g and is crystalline, can be formed into unoriented amorphous or crystallized sheets (including films). The poly(ethylene oxalate) can be in an industrial scale formed into a sheet (or film) by using an extruder equipped with a T-die and extruding it in the form of a sheet through the T-die at a temperature not lower than its melting point (Tm), for example, in a temperature range of from Tm to (Tm+50° C.). The sheet extruded is generally taken up on a roll. The thickness of the sheet is generally of the order of 1 μm to 3 mm.

The unoriented amorphous sheet formed from the poly(ethylene oxalate) according to the present invention is colorless and extremely high in transparency. When this amorphous sheet is subjected to a heat treatment (heat treatment under fixed length) in a fixed state within a temperature range of from the crystallization temperature (Tc) to the melting point (Tm) for 1 second to 10 hours, an unoriented crystallized sheet can be obtained. The unoriented crystallized sheet according to the present invention is a translucent, tough sheet hard to break even when it is bent.

The unoriented heat-set sheet (unoriented crystallized sheet) formed from the crystalline poly(ethylene oxalate) according to the present invention has the following physical properties:

(1) melting point (Tm): at least 130° C., (2) density: at least 1.50 g/cm$^3$, (3) tensile strength: at least 0.05 GPa, (4) modulus in tension: at least 1.0 GPa, (5) elongation: at least 3%, and (6) heat shrinkage (110° C./10 min): at most 30%.

In particular, the unoriented heat-set sheet formed from the poly(ethylene oxalate), which contains the recurring units represented by the formula (1) in a proportion of at least 90 basal mol % and belongs to Group (I) or a part of Group (II), has the following physical properties:

(1) melting point (Tm): at least 170° C., preferably at least 175° C., (2) density: at least 1.53 g/cm$^3$, (3) tensile strength: at least 0.06 GPa, preferably at least 0.08 GPa, (4) modulus in tension: at least 1.2 GPa, preferably at least 1.5 GPa, (5) elongation: at least 3%, and (6) heat shrinkage (110° C./10 min): at most 20%.

The glass transition temperature (Tg) of the unoriented sheet is generally 20°–50° C. However, it may be lowered to a temperature below that by changing the composition upon copolymerization or adding a plasticizer.

<Uniaxially oriented film>

A uniaxially oriented film (or sheet) can be obtained by uniaxially stretching the amorphous sheet of the poly(ethylene oxalate). More specifically, the amorphous sheet is uniaxially stretched 2–20 times by area by means of rolls or a tenter, generally, within a temperature range of from the glass transition temperature (Tg) to the crystallization temperature (Tc), thereby orienting it. The film obtained by the uniaxial stretching is subjected to a heat treatment (heat treatment under fixed length), generally, in a fixed state within a temperature range of from the crystallization temperature (Tc) to the melting point (Tm) for 1 second to 10 hours, whereby the film can be changed into a tough heat-set film. The thickness of the uniaxially oriented film is generally 1 μm to 3 mm.

The polymer low in crystallization rate belonging to Group (II) is hard to form coarse spherulites upon the formation of the amorphous sheet, and hence tends to provide a uniaxially oriented film having excellent physical properties in particular.

The uniaxially oriented film formed from the crystalline poly(ethylene oxalate) according to the present invention has the following physical properties:

(1) melting point (Tm): at least 130° C., (2) density: at least 1.50 g/cm$^3$, (3) tensile strength (oriented direction): at least 0.07 GPa, (4) modulus in tension (oriented direction): at least 1.0 GPa, (5) elongation (oriented direction): at least 3%, and (6) heat shrinkage (110° C./10 min) (oriented direction): at most 30%.

In particular, the uniaxially oriented film formed from the poly(ethylene oxalate), which contains the recurring units represented by the formula (1) in a proportion of at least 90 basal mol % and belongs to Group (I) or a part of Group (II), has the following physical properties:

(1) melting point (Tm): at least 170° C., preferably at least 175° C., (2) density: at least 1.53 g/cm$^3$, (3) tensile strength (oriented direction): at least 0.10 GPa, preferably at least 0.15 GPa, (4) modulus in tension (oriented direction): at least 1.2 GPa, preferably at least 1.5 GPa, (5) elongation (oriented direction): at least 3%, and (6) heat shrinkage (110° C./10 min) (oriented direction): at most 20%.

The glass transition temperature (Tg) of the uniaxially oriented film is generally 20°–50° C. However, it may be lowered to a temperature below that by changing the composition upon copolymerization or adding a plasticizer.

<Biaxially oriented film>

A biaxially oriented film (or sheet) can be obtained by biaxially stretching the amorphous sheet of the poly(ethylene oxalate). More specifically, the amorphous sheet is biaxially stretched 2–20 times by area by means of rolls and a tenter, generally, within a temperature range of from the glass transition temperature (Tg) to the crystallization temperature (Tc), thereby orienting it. The film obtained by the biaxial stretching is subjected to a heat treatment (heat treatment under fixed length), generally, in a fixed state or in a tensioned state within a temperature range of from the crystallization temperature (Tc) to the melting point (Tm) for 1 second to 10 hours, whereby the film can be changed into a tough heat-set film. The thickness of the biaxially oriented film is generally 1 μm to 3 mm.

Besides, the crystalline poly(ethylene oxalate) according to the present invention can be extruded by means of an extruder equipped with a ring die or the like within a temperature range of from Tm to (Tm+50° C.) and inflated 2–20 times by area in accordance with the inflation process, thereby forming it into a biaxially oriented film. This film can also be changed into a tough heat-set film by subjecting it to a heat treatment within a temperature range of from Tc to Tm.

The polymer low in crystallization rate belonging to Group (II) is hard to form coarse spherulites upon the formation of the amorphous sheet or the inflation, and hence tends to provide a biaxially oriented film having excellent physical properties in particular.

The biaxially oriented film formed from the crystalline poly(ethylene oxalate) according to the present invention has the following physical properties (physical properties in the maximum stretching direction):

(1) melting point (Tm): at least 130° C., (2) density: at least 1.50 g/cm$^3$, (3) tensile strength: at least 0.07 GPa, (4) modulus in tension: at least 1.0 GPa, (5) elongation: at least 3%, and (6) heat shrinkage (110° C./10 min): at most 30%.

In particular, the biaxially oriented film formed from the poly(ethylene oxalate), which contains the recurring units represented by the formula (1) in a proportion of at least 90 basal mol % and belongs to Group (I) or a part of Group (II), has the following physical properties:

(1) melting point (Tm): at least 170° C., preferably at least 175° C., (2) density: at least 1.53 g/cm$^3$, (3) tensile strength: at least 0.10 GPa, preferably at least 0.15 GPa, (4) modulus in tension: at least 1.2 GPa, preferably at least 1.5 GPa, (5) elongation: at least 3%, and (6) heat shrinkage (110° C./10 min): at most 20%, preferably at most 10%.

The glass transition temperature (Tg) of the biaxially oriented film is generally 20°–50° C. However, it may be lowered to a temperature below that by changing the composition upon copolymerization or adding a plasticizer.

<Fibers>

The crystalline poly(ethylene oxalate) according to the present invention can be used for melt-spinning, thereby obtaining fibers. More specifically, the polymer is extruded by means of an extruder equipped with a spinning nozzle having a single orifice or plural orifices in a temperature range of from Tm to (Tm+50° C.) in accordance with the conventional melt spinning process, and the thus-obtained extrudate is taken up at a take-up ratio $R_1$ (take-up speed/extrusion speed) of 2–1,000, further stretched 1–20 times as needed, and subjected to a heat treatment within a temperature range of from Tc to Tm, whereby tough heat-set fibers can be obtained. The poly(ethylene oxalate) according to the present invention can be formed directly into nonwoven fabric by a melt blowing process or the like. The diameter of the fibers is generally of the order of 1 μm to 1 mm.

The polymer low in crystallization rate belonging to Group (II) is hard to form coarse spherulites upon melt spinning of large-diameter yarn such as a monofilament, and hence tends to provide excellent large-diameter yarn in particular.

The fibers formed from the crystalline poly(ethylene oxalate) according to the present invention have the following physical properties:

(1) melting point (Tm): at least 130° C., (2) density: at least 1.50 g/cm$^3$, (3) tensile strength: at least 0.07 GPa, (4) modulus in tension: at least 3.0 GPa, (5) elongation: at least 3%, and (6) heat shrinkage (110° C./10 min): at most 40%.

In particular, the fibers formed from the poly(ethylene oxalate), which contains the recurring units represented by the formula (1) in a proportion of at least 90 basal mol % and belongs to Group (I) or a part of Group (II), have the following physical properties:

(1) melting point (Tm): at least 170° C., preferably at least 175° C., (2) density: at least 1.53 g/cm$^3$, (3) tensile strength: at least 0.15 GPa, preferably at least 0.25 GPa, (4) modulus in tension: at least 4.0 GPa, preferably at least 6.0 GPa, (5) elongation: at least 3%, and (6) heat shrinkage (110° C./10 min): at most 30%.

<Injection-molded product>

The crystalline poly(ethylene oxalate) according to the present invention can be molded into products of various shapes by an injection molding process. The poly(ethylene oxalate) is used for injection molding either as a neat resin by itself or as a composition by blending it with a filler (an inorganic filler and/or a fibrous filler) and other resins. The crystalline poly(ethylene oxalate) according to the present invention can be molded into a tough product by using an injection molding machine equipped with an injection mold and injecting it under conditions of a cylinder temperature within a range of from Tm to (Tm+50° C.), a mold temperature within a range of from 0° to 150° C. and an injection pressure within a range of from 0.01 to 1,000 GPa.

In the injection molding, the poly(ethylene oxalate) high in crystallization rate, which belongs to Group (I) or a part of Group (II), permits injection molding in a high-speed cycle.

The injection-molded product formed from the crystalline poly(ethylene oxalate) according to the present invention has the following physical properties:

(1) melting point (Tm): at least 130° C., preferably at least 170° C., (2) flexural strength: at least 0.01 GPa, preferably at least 0.02 GPa, and (3) modulus in flexure: at least 1.0 GPa, preferably at least 2.0 GPa.

When compositions containing the poly(ethylene oxalate) according to the present invention are used, injection-molded products having various physical properties can be obtained according to the kinds and blending amounts of fillers and blending resins.

Resin composition:

The poly(ethylene oxalate) according to the present invention may be used by itself and, if desired, may be blended with natural or synthetic polymeric materials, fillers and other additives to use it as compositions.

As examples of various materials to be blended, may be mentioned plastic materials such as polycaprolactone, polylactic acid, polyglycolic acid, polysuccinates, poly(3-hydroxybutanoic acid), (3-hydroxybutanoic acid/4-hydroxybutanoic acid) copolymers, starch, cellulose acetate, chitosan, alginic acid, polyvinyl alcohol, polyethylene, polyvinyl acetate, polyvinyl chloride, polystyrene and polyglutamates; rubbers and elastomers such as natural rubber, polyester elastomer, polyamide elastomer, styrene-butadiene-styrene block copolymers (SBS) and hydrogenated SBS; reinforcing fibers such as carbon fibers, silica fibers and glass fibers; inorganic fillers such as carbon black, silica powder, alumina powder, titanium oxide powder, talc, clay and calcium sulfate; and the like. These materials may be blended either singly or in any combination thereof.

The poly(ethylene oxalate) according to the present invention may be blended with plasticizers such as aliphatic monobasic acid esters (butyl oleate etc.), aliphatic dibasic acid esters (hexyl adipate etc.), oxyacid esters (triethyl acetylcitrate etc.) and phthalates (dibutyl phthalate etc.). The compositions obtained by blending these plasticizers can provide flexible formed or molded products having a glass transition temperature not higher than ordinary temperature and may be used in, for example, food packaging materials, wrapping materials and the like.

A low-boiling alcohol, low-boiling ether or the like may be sorbed in the poly(ethylene oxalate) according to the present invention to foam the polymer by heating, thereby providing formed or molded foams. Besides, formed or molded foams may be provided with ease even by a method of partially and pyrolytically decomposing the polymer itself.

The poly(ethylene oxalate) according to the present invention may also be added with various stabilizers such as an light stabilizer, a heat stabilizer and an antioxidant, a waterproofing agent (wax, silicone oil, higher alcohol, lanolin or the like), a pigment, a dye, a lubricant, a flame retardant and/or the like.

Production process of poly(ethylene oxalate):

The high-molecular weight poly(ethylene oxalate) according to the present invention cannot be obtained by the processes disclosed in the above documents (i) to (iv). Even by the processes described in the documents (ii) and (iii) which have reported that a polymer having film- and fiber-forming properties was obtained, any high-molecular weight poly(ethylene oxalate) cannot be obtained. More specifically, the high-molecular weight poly(ethylene oxalate) according to the present invention cannot be obtained even by the process of Cline et al. (abbreviated as "the conventional method 1") in which an ethylene oxalate monomer obtained by decomposing oligo(ethylene oxalate) and sublimating the decomposition product is subjected to ring-opening polymerization as it is, or the process of Alksnis et al. (abbreviated as "the conventional method 2") in which oligo(ethylene oxalate) obtained by the condensation of anhydrous oxalic acid with ethylene glycol is transesterified.

The high-molecular weight poly(ethylene oxalate) according to the present invention can be produced by heating a cyclic ethylene oxalate monomer, which has been obtained by heating oligo(ethylene oxalate) (namely, an ethylene oxalate oligomer) to depolymerize it, in an inert gas atmosphere, thereby subjecting the monomer to ring-opening polymerization. In order to obtain a copolymer by copolymerizing the cyclic ethylene oxalate monomer with a lactide, glycolide, lactone, alkylene oxalate and/or the like, it is only necessary to cause these comonomers to coexist in a predetermined proportion to copolymerize them.

The ethylene oxalate oligomer can be synthesized by a method known per se in the art. For example, an alkyl ester of oxalic acid (for example, diethyl oxalate) and ethylene glycol are subjected to condensation (dealcoholization) to form an ester, whereby the oligomer can be prepared. The condensation reaction can be carried out by, for example, heating the reactants at 150°–200° C., preferably 170°–190° C. for about 1–10 hours, preferably about 2–5 hours. The condensation reaction may be conducted in the presence of a catalyst such as sodium.

In the present invention, a cyclic ethylene oxalate monomer highly purified by a special method is used as the monomer for the poly(ethylene oxalate).

As a first preparation process of the cyclic ethylene oxalate monomer used in the present invention, may be mentioned a process wherein (i) the ethylene oxalate oligomer is washed with an organic solvent to purify, (ii) the thus-purified oligomer is heated under reduced pressure to depolymerize, thereby sublimating a monomer formed, and then (iii) the monomer obtained by the sublimation is recrystallized from an organic solvent, thereby purifying it.

The crude ethylene oxalate oligomer obtained by such a process as described above is previously washed with the organic solvent (for example, an aromatic hydrocarbon such as toluene) prior to the depolymerization-sublimation step to remove impurities which volatilize or bump during sublimation. For that purpose, it is preferable to wash the oligomer with, for example, a heated (e.g., 100°–200° C.) organic solvent.

In order to sublimate the resulting product while depolymerizing the purified oligomer, the purified oligomer and an optional catalyst (for example, tin tetrachloride) are placed in a reaction vessel and heated to 190°–220° C. under reduced pressure (for example, about 5–7 Torr) to depolymerize the oligomer, and the cyclic monomer formed is sublimated to recover in a cooling part of the reaction vessel.

The ethylene oxalate monomer obtained by the sublimation is recrystallized from a solvent (for example, acetonitrile, acetic acid, acetone or the like) to purify, thereby removing impurities mixed into the monomer in the sublimation step. The melting point (Tm) of the purified monomer obtained by such recrystallization is about 144.5° C.

As a second preparation process of the cyclic ethylene oxalate monomer used in the present invention, may be mentioned a process wherein (I) a mixture containing the ethylene oxalate oligomer and a high-boiling polar organic solvent is heated under ordinary pressure or reduced pressure to a temperature at which the depolymerization of the oligomer occurs, thereby dissolving the oligomer in the polar organic solvent, (II) the heating is further continued to depolymerize the oligomer in a solution phase, thereby distilling out a monomer formed together with the polar organic solvent, and then (III) the monomer is recovered from the distillate.

In the second preparation process, the high-boiling polar organic solvent having a boiling point of 225°–450° C., preferably 255°–430° C., more preferably 285°–420° C. is used. Examples of such a polar organic solvent include solvents capable of dissolving the ethylene oxalate oligomer therein, such as dibutyl phthalate (DBP), benzyl.butyl phthalate (BBP) and tricresyl phosphate (TCP).

In the second preparation process, the oligomer and high-boiling polar organic solvent (in a proportion of 0.3–50 times of the weight of the oligomer) are heated under ordinary pressure or reduced pressure, preferably 0.1–90 kPa to a temperature (170°–300° C.) at which the depolymerization of the oligomer occurs, to form a uniform solution. The heating is further continued to depolymerize the oligomer in a solution phase, thereby distilling out a cyclic ethylene oxalate monomer formed together with the polar organic solvent. The azeotropic distillate thus obtained is cooled, and a non-solvent (for example, cyclohexane, toluene, benzene or the like) for the monomer is added as needed, thereby solidifying and precipitating the monomer to separate and recover it from the azeotropic distillate. Thereafter, the monomer is washed with a non-solvent or extracted with a solvent and purified by recrystallization or the like as needed.

In the polymerization process according to the present invention, it is desirable to conduct the ring-opening polymerization of the monomer in a relatively low temperature range of from not lower than 150° C. to lower than 200° C., preferably from 155° C. to 190° C. The ring-opening polymerization of the cyclic ethylene oxalate monomer may preferably be conducted by heating the monomer to a temperature lower than 200° C. in the presence of a catalyst (for example, tin tetrachloride, tin dichloride, tin octanoate, aluminum chloride, zinc chloride, antimony trifluoride, titanium tetrachloride, zinc acetate, lead oxide or the like) in an inert gas atmosphere.

Application fields:

The poly(ethylene oxalate) according to the present invention is suitable for use as food packaging materials capable of subjecting to retorting, wrapping materials for electronic ranges and the like in the form of films and sheets. The foams formed or molded therefrom are suitable for use as containers for instant or precooked foods, containers for perishable fishes and shellfishes, fruit containers, egg containers, cushioning materials, thermal insulating materials and the like, all of which can lighten the burden imposed on the environment. The formed products in the form of a bag, bottles, and the like are used in fields of refuse sacks, food, cosmetics, kitchenware and other daily necessaries as packaging material or containers which can lighten the burden imposed on the environment. The fibers (monofilaments, multifilaments, nonwoven fabrics and the like) are used as packing tapes, fishlines, fishing nets, surgical sutures, sterilizable gauze and bandages, and the like, all of which can lighten the burden imposed on the environment. The poly(ethylene oxalate) according to the present invention is used as heat-sealing materials and barrier materials as well as multi-layer extrusion resins, laminating resins, carding resins, blending resins and the like. It is also used as X-ray resists, UV resists and the like.

ADVANTAGES OF THE INVENTION

According to the present invention, there can be provided high-molecular weight poly(ethylene oxalate) excellent in melt processability, heat resistance, crystalline properties, mechanical properties and the like. The present invention also provides various products formed or molded from the high-molecular weight poly(ethylene oxalate). The present invention further provides a novel production process of the high-molecular weight poly(ethylene oxalate). Since the high-molecular weight poly(ethylene oxalate) according to the present invention has good degradability in soil, it can be used in a wide variety of fields including a food packaging field as sheets, films, fibers, injection-molded products, foams and the like which can lighten the burden imposed on the environment.

EMBODIMENT OF THE INVENTION

The present invention will hereinafter be described more specifically by the following examples and comparative examples. It should however be borne in mind that the present invention is not limited to the following examples only. Incidentally, the following methods were followed for the measurement of the physical properties of polymers and formed or molded products in the following examples.

(1) Solution viscosity ($\eta_{inh}$):

An amorphous sheet of each polymer was used as a sample, and was immersed in a 8:2 (by weight) mixed solvent of m-chlorophenol/1,2,4-trichlorobenzene to dissolve the sample therein by heating at 150° C. for about 10 minutes, thereby preparing a solution in a concentration of about 0.4 g/dl. The viscosity of this solution was measured by means of an Ubbelohde viscometer at 30° C. (unit: dl/g).

(2) Melt viscosity ($\eta^*$)

A crystallized sheet obtained by heating an amorphous sheet of each polymer at about 130° C. for 10 minutes was used as a sample, and the melt viscosity of the sample was measured at 190° C. and a shear rate of 1,000/sec by means of a "Capirograph" (manufactured by Toyo Seiki Seisaku-Sho, Ltd.) equipped with a nozzle having a diameter (D) of 0.5 mm and a length (L) of 5 mm (unit: Pa.s).

(3) Tg, Tm, $\Delta Hm$ and $\Delta Hmc$:

An amorphous sheet of each polymer was used as a sample and heated by means of a differential scanning calorimeter ("DSC 30 Model", manufactured by METTLER INSTRUMENT AG) at a rate of 10° C./min in a nitrogen gas stream, thereby measuring the glass transition temperature (Tg), melting point (Tm) and melt enthalpy ($\Delta Hm$) of the sample. Immediately after the temperature of the sample reached 220° C., the sample was cooled at a rate of 10° C./min, thereby measuring the melt crystallization temperature (Tmc) and melt crystallization enthalpy ($\Delta Hmc$) of the sample.

(4) Density:

The density of each polymer was measured in the form of an amorphous sheet, and the density of each formed or molded product was measured on a crystallized product, both, in accordance with JIS R 7222 (a pycnometer method making use of n-butanol).

(5) Degradability in soil:

An amorphous sheet (thickness: 0.2 mm) of each polymer was cut into a strip about 3 cm wide and buried at the depth of 10 cm under the ground of a plowland. The strip was dug up at intervals of a half month to observe its shape to observe the time the amorphous sheet began to degrade so as to deform its shape. The degradability in soil was ranked as "Good" where the shape of the amorphous sheet began to degrade within a year after buried under ground.

(6) Heat shrinkage:

The heat shrinkage was determined by using a strip sample 10 mm wide for films and sheets and using, as a sample, a monofilament as it is for yarn. One end of the sample was held by a clip in such a manner that the length of the sample was 50 mm, and such a sample was hanged in an air-circulating gear oven heated to 110° C. to heat it. After heating for 10 minutes, the sample was taken out of the gear oven to measure the size of the sample, thereby determining its shrinkage.

(7) Tensile properties:

The tensile properties of sheets, films and fibers were measured by using a TENSILON (manufactured by Baldwin Co.) under conditions of a measuring temperature of 23° C., a sample length of 30 mm (in the case of a sheet or film, width: 10 mm) and a pulling rate of 100 mm/min for the measurements of tensile strength and elongation or 10 mm/min for the measurement of modulus in tension.

(8) Heat stability upon melt processing:

The heat stability upon melt processing was determined by regarding a temperature higher than Tm of each polymer sample by 10° C. as a melt-processing temperature and measuring an average rate of weight loss for 30 minutes from the beginning at that temperature by means of a TG 30 type TGA manufactured by METTLER INSTRUMENT AG in a nitrogen gas stream.

[EXAMPLE 1]

Preparation Example 1 of monomer:

One-liter autoclave was charged with 585 g (4.0 mol) of diethyl oxalate and 160 g (2.6 mol) of ethylene glycol. The contents were heated for 2 hours at 170° C. and 1 hour at 190° C. to condense them while distilling out ethanol, thereby forming a crude ethylene oxalate oligomer. After completion of the reaction, unreacted compounds were recovered under reduced pressure. Added to the crude oligomer remaining in the autoclave were 400 g of toluene, followed by heating for 2 hours at 130°–140° C. and for 10 minutes at 160°–170° C. with stirring. Thereafter, the contents were cooled and filtered to recover solid matter. This solid matter was dried under reduced pressure at 150° C. to obtain a purified oligomer (powder).

A glass tube oven for sublimation (manufactured by Shibata Scientific Technology Limited) was charged with 10 g of the thus-obtained purified oligomer and 10–20 mg of $SnCl_4.nH_2O$ (n=6.5) to heat the contents at 200°–220° C. for about 1 hour under a reduced pressure of about 5–7 Torr, thereby sublimating an ethylene oxalate monomer formed while depolymerizing the oligomer to recover the monomer over a cold finger of the oven. This sublimated monomer was further washed with toluene and then dissolved in 500 g of acetonitrile heated to 40°–50° C. The solution was left at rest at room temperature for 3 days and then filtered. Benzene was added to the mother liquor to precipitate monomer crystals, a liquid phase was decanted, and the monomer crystals were washed twice with benzene at about 50° C. The thus-obtained crystals were dried under reduced pressure at room temperature, thereby preparing a sublimated, recrystallized monomer (MOX-1) (Tm =144.5° C.). Several batches of (MOX-1) were prepared in the same manner as described above.

Synthesis of polymer:

A 4.5 wt. % ether solution of $SnCl_4.nH_2O$ (n=6.5) was sprinkled over 50 g of the monomer (MOX-1) so as to add 0.008 g of $SnCl_4.nH_2O$ (n=6.5). This monomer was charged into a PFA (tetrafluoroethylene/perfluorovinyl ether copolymer) tube equipped with a gas inlet tube made of a PTFE (polytetrafluoroethylene) tube. After ether and water were blown off by introducing nitrogen gas for 20 minutes, the monomer was heated at 170° C. for 2 hours while introducing nitrogen gas, thereby polymerizing the monomer.

The monomer melted in about 5 minutes from the beginning of the heating, and nitrogen gas bubbled through the molten monomer. The viscosity of the monomer then rapidly increased, and the melt almost completely stopped moving and solidified after about 5–10 minutes to turn to a sponge-like solid. After completion of the heating, the sponge-like solid was allowed to cool at room temperature, thereby crystallizing the solid. After the crystallization, the sponge-like solid was taken out of the PFA tube to obtain a polymer (POX-1). The polymer was quickly placed in a polyethylene bag to store. The physical properties of the thus-obtained polymer are shown in Table 1.

[EXAMPLES 2–5]

Copolymers were synthesized in the same manner as in Example 1 except that (R)-(−)-lactide and optional ε-caprolactone were added to the monomer (MOX-1) in their corresponding small amounts shown in Table 1, thereby obtaining copolymers POX-2 (Example 2), POX-3 (Example 3), POX-4 (Example 4) and POX-5 (Example 5). The compositions and physical properties of these copolymers are shown collectively in Table 1.

[EXAMPLE 6]

Preparation Example 2 of monomer:

A 300-ml three-necked flask connected to a receiver cooled with ice water was charged with 40 g of a crude ethylene oxalate oligomer prepared in the same manner as in Example 1, to which 200 g of dibutyl phthalate (DBP) were added as a high-boiling polar organic solvent.

While stirring the contents, they were heated at 235°–245° C. under a reduced pressure of 10 kPa in a nitrogen atmosphere, thereby dissolving the oligomer into a uniform solution. The heating was continued at the same temperature to cause the oligomer to depolymerize in the uniform solution phase. Azeotropic distillation of an ethylene oxalate monomer formed with the solvent was performed until the azeotrope was almost distilled out, thereby collecting the whole amount of the azeotropic distillate in the receiver cooled with ice water. To the collected distillate, toluene as a non-solvent was added in an amount twice the collected distillate, and the mixture was allowed to cool, thereby precipitating crystals of the ethylene oxalate monomer. After allowing to cool, the crystal deposited were collected by filtration. The collected crystals were dissolved in acetonitrile at 40°–50° C. to saturation, and the solution was allowed to cool overnight in a refrigerator to recrystallize the monomer. After the recrystallization was conducted repeatedly, the crystals thus obtained were collected by filtration and dried under reduced pressure at about 40° C., thereby obtaining a cyclic ethylene oxalate monomer (MOX-1A) according to the depolymerization process in the uniform solution phase. The same process as described above was conducted repeatedly to obtain several batches of MOX-1A.

Synthesis of polymer:

A polymer (POX-6) was obtained in exactly the same manner as in Example 1 except that the ethylene oxalate monomer (MOX-1A) was used as the monomer. The physical properties of the thus-obtained polymer are shown in Table 1.

[EXAMPLES 7–8]

Copolymers (POX-7) and (POX-8) were obtained in exactly the same manner as in Examples 2–5 except that the ethylene oxalate monomer (MOX-1A) and a small amount of glycolide were used as the monomers. The compositions and physical properties of these copolymers are shown collectively in Table 1.

[Comparative example 1]

Preparation of monomer:

The purification of the crude ethylene oxalate oligomer with toluene in the preparation process of the monomer in Example 1 was omitted to dry directly the oligomer under reduced pressure at 150° C. The addition of $SnCl_4 \cdot nH_2O$ was also omitted to depolymerize directly the oligomer using the glass tube oven, thereby sublimating a monomer formed to obtain a sublimated monomer (MOX-2). The purification of the sublimated monomer by recrystallization was omitted to use the monomer in polymerization as it is (in accordance with the conventional method 1).

Synthesis of polymer:

Polymerization was performed in the same manner as in Example 1 except that the monomer (MOX-2) was used as the monomer. The physical properties of the thus-obtained polymer (CPOX-1) are shown in Table 1.

[Comparative Example 2]

A 1,000-ml three-necked flask was charged with 40.26 g of anhydrous oxalic acid, 25 ml of ethylene glycol, 500 ml of benzene and 1.52 g of p-toluenesulfonic acid. The contents were heated with stirring for 2.5 hours at the reflux temperature of benzene to obtain a condensate. This condensate was washed with acetone and dried at 80° C. to obtain an oligomer. Added to 10 g of this oligomer was 0.002 g of $SnCl_2 \cdot 2H_2O$. The mixture was heated at 180° C. for 6 hours while causing argon to flow slowly under a reduced pressure of 0.5–1.0 Torr, thereby carrying out a transesterification reaction to obtain a polymer (CPOX-2) (in accordance with the conventional method 2). The physical properties of the polymer (CPOX-2) are shown in Table 1.

TABLE 1

| | Composition of monomer | | | | | | | | | | | Average rate of weight loss | | | De- | | |
|---|---|---|---|---|---|---|---|---|---|---|---|---|---|---|---|---|---|
| | Mono-mer code | Comono-mer | mol % | Poly-mer code | $\eta_{inh}$ dl/g | $\eta^*$ Pa·s | Tg °C. | Tm °C. | ΔHm J/g | Tmc °C. | ΔHmc J/g | (*2) wt. %/min | grada-bility in soil | Den-sity (*3) | Classifi-cation (*4) Group | Type | Remarks |
| Ex. 1 | MOX-1 | — | | POX-1 | 1.25 | 305 | 36 | 180 | 65 | 102 | 53 | 0.18 | Good | 1.52 | (I) | (A) | |
| Ex. 2 | MOX-1 | Lactide | 1.5 | POX-1 | 1.00 | 135 | 39 | 179 | 78 | 102 | 4 | 0.08 | Good | 1.52 | (II) | (B) | |
| Ex. 3 | MOX-1 | Lactide | 4.3 | POX-3 | 0.89 | 120 | 37 | 175 | 67 | 99 | 2 | 0.06 | Good | 1.51 | (II) | (B) | |
| Ex. 4 | MOX-1 | Lactide Capro-lactone | 4.0 0.1 | POX-4 | 0.80 | 110 | 40 | 176 | 70 | 105 | 1 | 0.06 | Good | 1.51 | (II) | (B) | |
| Ex. 5 | MOX-1 | Lactide | 16.4 | POX-5 | 0.80 | 70 | 42 | — | — | — | — | — | Good | 1.49 | (II) | (C) | |
| Ex. 6 | MOX-1A | — | | POX-6 | 1.31 | 400 | 40 | 183 | 80 | 101 | 47 | 0.17 | Good | 1.52 | (I) | (A) | |
| Ex. 7 | MOX-1A | Glycolide | 5.0 | POX-7 | 1.30 | 400 | 39 | 171 | 53 | — | — | 0.05 | Good | 1.51 | (II) | (B) | |
| Ex. 8 | MOX-1A | Glycolide | 10.0 | POX-8 | 1.27 | 380 | 37 | 162 | 10 | — | — | 0.05 | Good | 1.50 | (II) | (B) | |
| Comp. Ex. 1 | MOX-2 | — | | CPOX-1 | 0.22 | 15 | 33 | 181 | 78 | 107 | 67 | 0.36 | Good | — | (I) | (A) | Conventional method 1 |
| Comp. Ex. 2 | (*1) | — | | CPOX-2 | 0.15 | <2 | 32 | 178 | 96 | 102 | 32 | 0.55 | Good | — | (I) | (A) | Conventional method 2 |

(Note)
(*1) The polymer was synthesized from the oligomer by the transesterification process
(*2) The average rate of weight loss is an average rate of weight loss for 30 minutes from the beginning when heated by means of TGA at a melt-processing temperature (i.e., Tm + 10° C.) in a nitrogen gas stream.
(*3) The density was measured in accordance with the density measurement for the amorphous sheet.
(*4) Classification: the polymers of Groups (I) and (II) are polymers containing the copolymerizing component in proportions of lower than 1 basal mol % and not lower than 1 basal mol %, respectively. Types (A), (B) and (C) mean a crystalline polymer high in crystallization rate, a crystalline polymer low in crystallization rate and a noncrystalline polymer, respectively.

(1) Each amorphous sheet used for measuring the various physical properties was prepared in accordance with the process described in Example 9 which will be described subsequently.

(2) With respect to the degradability in soil, all the amorphous sheets of the respective polymers were observed beginning to degrade in about 0.5–1 month. More specifically, the amorphous sheets of the respective polymers were buried under the ground for 1 month in winter and then taken out of the ground. As a result, all the sheets were observed being decomposed into many pieces principally from their edges. Even if portions of the sheets remained, they whitened and became brittle, so that their mechanical strength was unmeasurable.

[EXAMPLE 9]

Amorphous sheet:

The polymer (POX-1) obtained in Example 1 was preheated for about 15 minutes at a temperature of [the melting point of the polymer+20° C.], pressed for 15 seconds under a pressure of 10 MPa by means of a hot press and then quickly transferred to a cold press to quench it, thereby forming an amorphous sheet (S-1) which had a thickness of 0.2 mm and was substantially not oriented. The thus-formed sheet was quickly placed in a polyethylene bag to store. The sheet was colorless and extremely high in transparency. The physical properties of this amorphous sheet are as follows:

(1) thickness: 0.2 mm, density: 1.52 g/cm$^3$;

(2) tensile strength: 0.09 GPa;

(3) modulus in tension: 2.2 GPa; and (4) elongation: 11%.

Besides, the polymers (POX-2) to (POX-8), and (CPOX-1) and (CPOX-2) obtained in Examples 2 to 8, and Comparative Examples 1 and 2, respectively, were used to form unoriented amorphous sheets (S-2) to (S-8), and (CS-1) and (CS-2) in the same manner as described above. However, the preheating temperature of POX-5 was changed to 200° C. The respective amorphous sheet thus obtained were colorless and extremely high in transparency.

[EXAMPLE 10]

Unoriented crystallized sheet:

The amorphous sheet (S-1) formed in Example 9 was crystallized by holding it between two PTFE sheets and placing a weight of about 1 kPa thereon to subject the amorphous sheet to a heat treatment at 150° C. for 15 minutes. As a result, a translucent and tough unoriented crystallized sheet, which was hard to break even when it was bent, was obtained. The physical properties of this unoriented crystallized sheet are as follows:

(1) thickness: 0.2 mm;

(2) density: 1.56 g/cm$^3$ or higher;

(3) tensile strength: 0.11 GPa;

(4) modulus in tension: 2.6 GPa;

(5) elongation: 8%; and (6) heat shrinkage (110° C./10 min):<2%.

The amorphous sheets (S-2) to (S-8), and (CS-1) and (CS-2) formed in Example 9 were also subjected to a heat treatment in the same manner as described above, thereby crystallizing them. Translucent and tough unoriented crystallized sheets, which were hard to break even when they were bent, were obtained from the amorphous sheets (S-2) to (S-4) and (S-6) to (S-8). A transparent unoriented crystallized sheet, which was hard to break even when it was bent, was obtained from the amorphous sheet (S-5). However, brittle unoriented crystallized sheets, which were easy to break even when they were bent, were obtained from the amorphous sheets (CS-1) and (CS-2).

[EXAMPLE 11]

Uniaxially oriented film:

The amorphous sheets (S-1), (S-2), (S-5), (S-6), (S-8), (CS-1) and (CS-2) formed in Example 9 were respectively cut into strips 10.0 mm wide. Each of these strips was stretched 4.0 times in an uniaxial direction at 45°–50° C. The stretched film thus obtained was then fixed to a metal frame to heat set the film at 150° C. for 2 minutes while maintaining the length of the film constant, thereby preparing a uniaxially stretched film. Uniaxially oriented films were able to be obtained from the amorphous sheets (S-1), (S-2), (S-5), (S-6) and (S-8). However, the amorphous sheet (CS-1) and (CS-2), which were respectively formed from the polymers low in molecular weight, broke during the stretching. The physical properties of the respective uniaxially oriented films thus obtained are as shown in Table 2.

TABLE 2

| Polymer code | POX-1 | POX-2 | POX-5 | POX-6 | POX-8 | CPOX-1 | CPOX-2 |
|---|---|---|---|---|---|---|---|
| Thickness (μm) | 65 | 70 | 60 | 67 | 65 | (*2) | (*2) |
| Density (g/cm$^3$) | >1.55 | >1.55 | — | >1.55 | >1.55 | | |
| Tensile strength (GPa) | 0.21 | 0.18 | 0.02 | 0.23 | 0.18 | | |
| Modulus in tension (GPa) | 5.7 | 4.8 | 4.5 | 5.7 | 3.9 | | |
| Elongation (%) | 38 | 40 | 110 | 42 | 50 | | |
| Shrinkage (%) (110° C./10 min) | <4 | <6 | (*1) | <4 | <6 | | |

(*1): Unmeasurable due to violent shrinkage.
(*2): The amorphous sheet broke during the uniaxial stretching.

[EXAMPLE 12]

Biaxially oriented film:

The amorphous sheets (S-1), (S-2), (S-5), (S-6), (S-8), (CS-1) and (CS-2) formed in Example 9 were respectively cut into pieces 10 cm square. Each of these pieces was biaxially stretched 3.0 times in the machine direction and 3.0 times in the transverse direction at 40°-5° C. by a biaxial stretching machine (manufactured by Toyo Seiki Seisaku-Sho, Ltd.). The stretched film thus obtained was then fixed to a metal frame to heat-treat at 150° C. for 2 minutes while maintaining the length of the film constant, thereby preparing a biaxially oriented film. Biaxially oriented films were able to be obtained from the amorphous sheets (S-1), (S-2), (S-5), (S-6) and (S-8). However, the amorphous sheet (CS-1) and (CS-2), which were respectively formed from the polymers low in molecular weight, broke during the stretching. The physical properties of the respective biaxially oriented films thus obtained are as shown in Table 3.

lized strip was charged into a Capirograph (manufactured by Toyo Seiki Seisaku-Sho, Ltd.) equipped with a nozzle having a diameter (D) of 0.5 mm and a length (L) of 5 mm to melt-extrude it at 190° C. The thus-obtained extrudate was taken up at a take-up ratio $R_1$ (take-up speed/extrusion speed) of 5 to obtain a yarn stock. However, when the amorphous sheet (CS-1) and (CS-2), which were respectively formed from the polymers low in molecular weight, were used, severe drawdown occurred upon the melt extrusion, resulting in a failure to spin. Each of the yarn stocks thus obtained was stretched 4.0 times at 50°-55° C. and then heat-treated at 150° C. for 5 minutes while main-

TABLE 3

| Polymer code | POX-1 | POX-2 | POX-5 | POX-6 | POX-8 | CPOX-1 | CPOX-2 |
|---|---|---|---|---|---|---|---|
| Thickness (μm) | 11 | 10 | 10 | 10 | 11 | (*2) | (*2) |
| Density (g/cm³) | >1.55 | >1.55 | — | >1.55 | >1.55 | | |
| Tensile strength (GPa) | 0.22 | 0.20 | 0.03 | 0.24 | 0.23 | | |
| Modulus in tension (GPa) | 5.3 | 4.8 | 2.5 | 5.2 | 4.0 | | |
| Elongation (%) | 70 | 80 | >150 | 75 | 90 | | |
| Shrinkage (%) (110° C./10 min) | <4 | <6 | (*1) | <4 | <6 | | |

(*1): Unmeasurable due to severe shrinkage.
(*2): The amorphous sheet broke during the biaxial stretching.

The biaxially oriented films formed from the amorphous sheets (S-1) and (S-2) were able to be easily heat-sealed by placing each two sheets of the respective amorphous sheets to overlap each other and heating them under pressure by an iron the surface temperature of which was about 200° C.

[EXAMPLE 13]

Stretched monofilament:

The amorphous sheets (S-1), (S-2), (S-5), (S-6), (S-8), (CS-1) and (CS-2) formed in Example 9 were respectively cut into strips about 0.5 cm wide. Each of the strips was heated at 130° C. for 10 minutes to crystallize. The crystaltaining its length constant, thereby heat setting it. The physical properties of the respective stretched monofilaments thus obtained are as shown in Table 4.

TABLE 4

| Polymer code | POX-1 | POX-2 | POX-5 | POX-6 | POX-8 | CPOX-1 | CPOX-2 |
|---|---|---|---|---|---|---|---|
| Diameter (μm) | 114 | 90 | 80 | 120 | 100 | (*2) | (*2) |
| Density (g/cm³) | >1.55 | >1.55 | — | >1.55 | >1.55 | | |
| Tensile strength (GPa) | 0.48 | 0.44 | 0.03 | 0.50 | 0.50 | | |
| Modulus in tension (GPa) | 11.0 | 9.0 | 3.1 | 10.0 | 8.0 | | |
| Elongation (%) | 25 | 35 | >100 | 30 | 40 | | |
| Shrinkage (%) (110° C./10 min) | <2 | <5 | (*1) | <2 | <6 | | |

(*1): Unmeasurable due to severe shrinkage.
(*2): The amorphous sheet broke during the biaxial stretching.

[EXAMPLE 14]

Injection-molded product:

The polymers (POX-1), (POX-2), (POX-5), (POX-6) and (POX-8) were separately heated at 130° C. to crystallize. Each of the crystallized polymers was ground and dried under reduced pressure at 120° C. to obtain crystallized polymer powder. The crystallized polymer powder thus obtained was extruded at about 190° C. in the form of a strand through an extruder. The extrudate was quenched and then chopped into pellets. The pellets are air-dried at 120° C. for 2 hours to crystallize. The crystallized pellets were injected by means of an injection molding machine (cylinder temperature: 200° C., holding pressure: 0.1 GPa, mold temperature: 30° C.) equipped with a mold, thereby producing an injection-molded product in the form of a dumbbell. This molded product was annealed at 120° C. for 5 hours. The physical properties of the respective injection-molded products thus obtained are as shown in Table 5. Both flexural strength and modulus in flexture were measured at 23° C. in accordance with ASTM D 790.

TABLE 5

| Polymer code | POX-1 | POX-2 | POX-5 | POX-6 | POX-8 |
|---|---|---|---|---|---|
| Density (g/cm³) | >1.55 | >1.55 | — | >1.55 | >1.55 |
| Flextural strength (GPa) | 0.05 | 0.04 | 0.03 | 0.06 | 0.06 |
| Modulus in flexture (GPa) | 2.6 | 2.4 | 2.0 | 2.5 | 2.3 |

[EXAMPLE 15]

Laminated paper:

The polymer (POX-2) obtained in Example 2 was preheated at 200° C. for about 15 minutes, pressed for 15 seconds under a pressure of 10 MPa by means of a hot press and then quickly transferred to a cold press to quench it, thereby forming an amorphous sheet (S-2-1) which had a thickness of 0.1 mm and was substantially not oriented. The thus-formed sheet was colorless and extremely high in transparency. Two amorphous sheets (S-2-1) were used to put base paper of the same kind as that used in milk cartons between them. These sheets were further held between PTFE sheets, followed by heating under pressure at 200° C. by means of a hot press, thereby laminating the sheets of the polymer (POX-2) on both sides of the base paper. This laminate was pressed at about 90° C. by means of a cold press to crystallize the amorphous sheets. A water-resistant glossy base paper web on both sides of which the poly (ethylene oxalate) was laminated was obtained in such a way.

We claim:

1. Poly(ethylene oxalate) containing recurring units represented by the following formula (1):

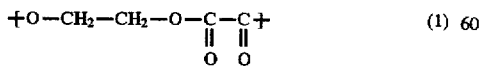    (1)

in a proportion or at least 60 basal mol %, wherein (a) the solution viscosity ($\eta_{inh}$) is at least 0.25 dl/g as measured at 30° C. and a polymer concentration of 0.40 g/dl in a 4:1 (by weight) mixed solvent of m-chlorophenol and 1,2,4-trichloro-benzene, (b) the melt viscosity ($\eta^*$) is at least 30 pa.s as measured at 190° C. and a shear rate of 1,000/sec, and (c) the density is at least 1.48 g/cm³ as measured in an amorphous state.

2. The poly(ethylene oxalate) according to claim 1, which is substantially a homopolymer containing the recurring units represented by the formula (1) in a proportion exceeding 99 basal mol %.

3. The poly(ethylene oxalate) according to claim 1, which is a copolymer containing the recurring units represented by the formula (1) in a proportion of 60–99 basal mol % and recurring units of at least one kind selected from the group consisting of a recurring unit represented by the following formula (2):

    (2)

a recurring unit represented by the following formula (3):

    (3)

wherein n is an integer of 1–6, and a recurring unit represented by the following formula (4):

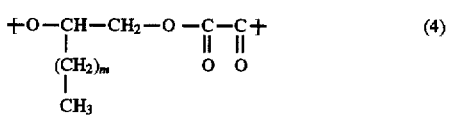    (4)

wherein m is an integer of 0–6, in a proportion of 1–40 basal mol %.

4. The poly(ethylene oxalate) according to claim 1, which further has the following physical properties:

(d) the melting point (Tm) being at least 130° C.;

(e) the melt enthalpy (ΔHm) being at least 20 J/g; and (f) the melt crystallization enthalpy (ΔHmc) being at least 20 J/g, wherein the melting point (Tm) and melt enthalpy (ΔHm) are a melting point and a melt enthalpy detected when heating an amorphous sheet sample 0.2 mm thick by means of a differential scanning calorimeter at a rate of 10° C./min in an inert gas atmosphere, and the melt crystallization enthalpy (ΔHmc) is a melt crystallization enthalpy detected when cooling the amorphous sheet sample at a rate of 10° C./min immediately after heating the amorphous sheet sample to 220° C.

5. The poly(ethylene oxalate) according to claim 1, which further has the following physical properties:

(d) the melting point (Tm) being at least 130° C.;

(e) the melt enthalpy (ΔHm) being at least 20 J/g; and (g) the melt crystallization enthalpy (ΔHmc) being smaller than 20 J/g.

6. The poly(ethylene oxalate) according to claim 1, which further has the following physical properties:

(h) the melt enthalpy (ΔHm) being smaller than 20 J/g.

7. The poly(ethylene oxalate) according to claim 1, which further has the following physical properties:

(i) the average rate of weight loss on thermal decomposition being at most 0.5 wt. %/min.

8. The poly(ethylene oxalate) according to claim 1, which further has the following physical properties:

(i) the average rate of weight loss on thermal decomposition being at most 0.1 wt. %/min.

9. An unoriented sheet formed from the poly(ethylene oxalate) according to claim 1 and having the following physical properties:

(1) melting point (Tm): at least 130° C.,
(2) density: at least 1.50 g/cm³,
(3) tensile strength: at least 0.05 GPa,
(4) modulus in tension: at least 1.0 GPa,
(5) elongation: at least 3%, and
(6) heat shrinkage (110° C./10 min): at most 30%.

10. A uniaxially oriented film formed from the poly (ethylene oxalate) according to claim 1 and having the following physical properties:

(1) melting point (Tm): at least 130° C.,
(2) density: at least 1.50 g/cm³,
(3) tensile strength (oriented direction): at least 0.07 GPa,
(4) modulus in tension (oriented direction): at least 1.0 GPa,
(5) elongation (oriented direction): at least 3%, and
(6) heat shrinkage (110° C./10 min) (oriented direction): at most 30%.

11. A biaxially oriented film formed from the poly (ethylene oxalate) according to claim 1 and having the following physical properties:

(1) melting point (Tm): at least 130° C.,
(2) density: at least 1.50 g/cm³,
(3) tensile strength: at least 0.07 GPa,
(4) modulus in tension: at least 1.0 GPa,
(5) elongation: at least 3%, and
(6) heat shrinkage (110° C./10 min): at most 30%.

12. Fibers formed from the poly(ethylene oxalate) according to claim 1 and having the following physical properties:

(1) melting point (Tm): at least 130° C.,
(2) density: at least 1.50 g/cm³,
(3) tensile strength: at least 0.07 GPa,
(4) modulus in tension: at least 3.0 GPa,
(5) elongation: at least 3%, and
(6) heat shrinkage (110° C./10 min): at most 40%.

13. An injection-molded product formed from the poly (ethylene oxalate) according to claim 1 and having the following physical properties:

(1) melting point (Tm): at least 130° C.,
(2) flexural strength: at least 0.01 GPa, and
(3) modulus in flexure: at least 1.0 GPa.

14. A process for the production of poly(ethylene oxalate), which comprises subjecting a cyclic ethylene oxalate monomer obtained by depolymerizing an ethylene oxalate oligomer to ring-opening polymerization by heating the monomer in an inert gas atmosphere, wherein a monomer purified by (i) washing the ethylene oxalate oligomer with an organic solvent to purify, (ii) heating the thus-purified oligomer under reduced pressure to depolymerize, thereby sublimating a monomer formed, and then (iii) recrystallizing the monomer obtained by the sublimation from an organic solvent is used as the cyclic ethylene oxalate monomer.

15. The process according to claim 14, wherein the cyclic ethylene oxalate monomer is subjected to ring-opening polymerization by heating the monomer to a temperature not lower than 150° C. but lower than 200° C. in the presence of a ring-opening polymerization catalyst.

16. The process according to claim 14, wherein a substantial homopolymer containing recurring units represented by the following formula (1):

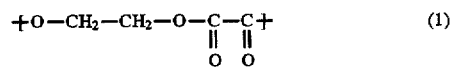

in a proportion exceeding 99 basal mol % is prepared by the ring-opening polymerization of the cyclic ethylene oxalate monomer.

17. The process according to claim 14, wherein the cyclic ethylene oxalate monomer is subjected to ring-opening copolymerization with at least one cyclic monomer selected from the group consisting of lactides, glycolides, lactones (having at most 7 carbon atoms) and alkylene oxalates (the alkylene group of which has 3-9 carbon atoms).

18. The process according to claim 17, wherein a copolymer containing recurring units represented by the following formula (1):

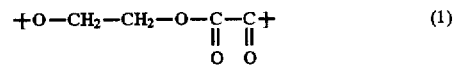

in a proportion of 60-99 basal mol % and recurring units of at least one kind selected from the group consisting of a recurring unit represented by the following formula (2):

a recurring unit represented by the following formula (3):

wherein n is an integer of 1-6, and a recurring unit represented by the following formula (4):

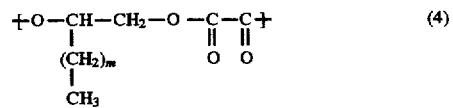

wherein m is an integer of 0-6, in a proportion of 1-40 basal mol % is prepared by the ring-opening copolymerization of the cyclic ethylene oxalate monomer.

19. A process for the production of poly(ethylene oxalate), which comprises subjecting a cyclic ethylene oxalate monomer obtained by depolymerizing an ethylene oxalate oligomer to ring-opening polymerization by heating the monomer in an inert gas atmosphere, wherein a monomer obtained by (I) heating a mixture containing the ethylene oxalate oligomer and a high-boiling polar organic solvent under ordinary pressure or reduced pressure to a temperature at which the depolymerization of the oligomer occurs, thereby dissolving the oligomer in the polar organic solvent, (II) further continuing the heating to depolymerize the oligomer in a solution phase, thereby distilling out a monomer formed together with the polar organic solvent, and then (III) recovering the monomer from the distillate is used as the cyclic ethylene oxalate monomer.

20. The process according to claim 19, wherein the cyclic ethylene oxalate monomer is subjected to ring-opening polymerization by heating the monomer to a temperature not lower than 150° C. but lower than 200° C. in the presence of a ring-opening polymerization catalyst.

21. The process according to claim 19, wherein a substantial homopolymer containing recurring units represented by the following formula (1):

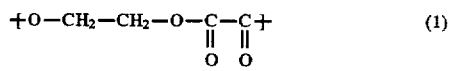 (1)

in a proportion exceeding 99 basal mol % is prepared by the ring-opening polymerization of the cyclic ethylene oxalate monomer.

22. The process according to claim 19, wherein the cyclic ethylene oxalate monomer is subjected to ring-opening copolymerization with at least one cyclic monomer selected from the group consisting of lactides, glycolides, lactones (having at most 7 carbon atoms) and alkylene oxalates (the alkylene group of which has 3–9 carbon atoms).

23. The process according to claim 22, wherein a copolymer containing recurring units represented by the following formula (1):

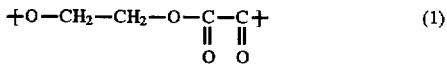 (1)

in a proportion of 60–99 basal mol % and recurring units of at least one kind selected from the group consisting of a recurring unit represented by the following formula (2):

 (2)

a recurring unit represented by the following formula (3):

 (3)

wherein n is an integer of 1–6, and a recurring unit represented by the following formula (4):

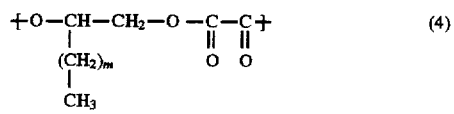 (4)

wherein m is an integer of 0–6, in a proportion of 1–40 basal mol % is prepared by the ring-opening copolymerization of the cyclic ethylene oxalate monomer.

* * * * *